US012662236B2

(12) United States Patent
Ullman et al.

(10) Patent No.: US 12,662,236 B2
(45) Date of Patent: Jun. 23, 2026

(54) LEADING-EDGE DUCTED FAN THRUST REDUCTION SYSTEM

(71) Applicant: Cub Crafters, Inc., Yakima, WA (US)

(72) Inventors: David G. Ullman, Independence, OR (US); Vincent H. Homer, Independence, OR (US); Patrick J. Horgan, Naches, WA (US)

(73) Assignee: Cub Crafters, Inc., Yakima, WA (US)

( * ) Notice: Subject to any disclaimer, the term of this patent is extended or adjusted under 35 U.S.C. 154(b) by 0 days.

(21) Appl. No.: 19/034,465

(22) Filed: Jan. 22, 2025

(65) Prior Publication Data

US 2025/0256838 A1 Aug. 14, 2025

Related U.S. Application Data

(60) Provisional application No. 63/553,603, filed on Feb. 14, 2024.

(51) Int. Cl.
| | |
|---|---|
| *B64C 11/00* | (2006.01) |
| *B64C 7/02* | (2006.01) |
| *B64C 13/04* | (2006.01) |
| *B64C 13/16* | (2006.01) |
| *B64C 13/50* | (2006.01) |
| *B64C 21/00* | (2023.01) |
| *B64C 23/00* | (2006.01) |

(52) U.S. Cl.
CPC .............. *B64C 11/001* (2013.01); *B64C 7/02* (2013.01); *B64C 13/04* (2013.01); *B64C 13/16* (2013.01); *B64C 13/50* (2013.01); *B64C 21/00* (2013.01); *B64C 23/00* (2013.01)

(58) Field of Classification Search
CPC .... B64C 9/34; B64C 9/36; B64C 9/38; B64C 7/02; B64C 21/00; B64C 3/32; B64D 27/31; B64D 27/32
See application file for complete search history.

(56) References Cited

U.S. PATENT DOCUMENTS

| | | | |
|---|---|---|---|
| 10,099,793 B2 * | 10/2018 | Ullman .................. | B64D 31/06 |
| 10,926,868 B1 | 2/2021 | Ullman et al. | |
| 11,305,869 B1 * | 4/2022 | Ward ........................ | B64C 9/24 |
| 2018/0086448 A1 * | 3/2018 | Kroo .................. | B64C 29/0033 |
| 2020/0391859 A1 * | 12/2020 | Groninga ............ | B64C 29/0033 |

* cited by examiner

*Primary Examiner* — Nicholas McFall
(74) *Attorney, Agent, or Firm* — Christensen O'Connor Johnson Kindness PLLC

(57) ABSTRACT

The present invention is a powered electric lift augmentation systems (ELAS's) to add drag while minimally reducing or enhancing the lift augmentation of an airplane. At least one ELAS is attached to an airfoil, and each ELAS comprises: a nacelle; and electric duct fan (EDF) housed within the nacelle; an optional pylon perpendicularly connected beneath the nacelle; an optional slat; and one or more drag elements, pivotably connected through a range of angles to airflow. Each drag element comprises a hinged plate, or a pair of opposing plates, connected to a pilot's control element able to rotate the plates to create a range of drag levels or to stow away. The drag elements are connected to the airfoil leading edge, the nacelle, pylon, or slat; and may further comprises holes. As ELAS assembly may comprise one or more ELAS systems attached to an airfoil (aerodynamic lifting element—ALE).

19 Claims, 14 Drawing Sheets

*Prior Art*

*Prior Art*

*Prior Art*

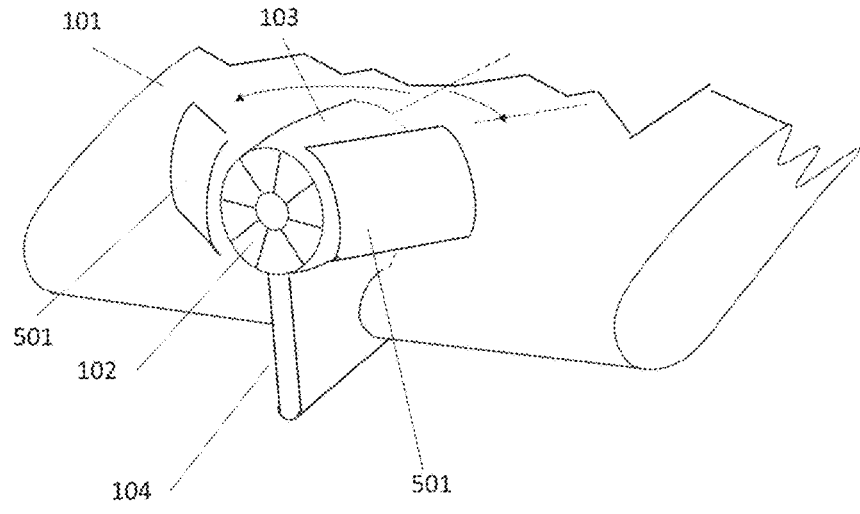
FIG. 5A
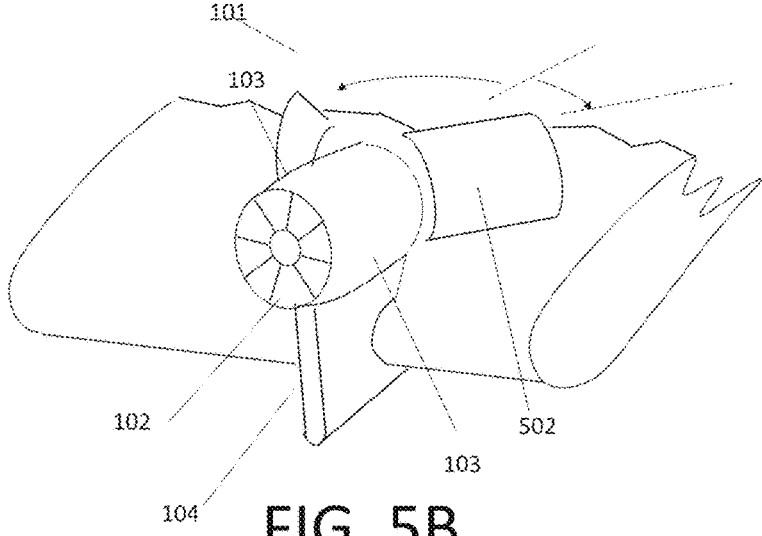
FIG. 5B
FIG. 5C

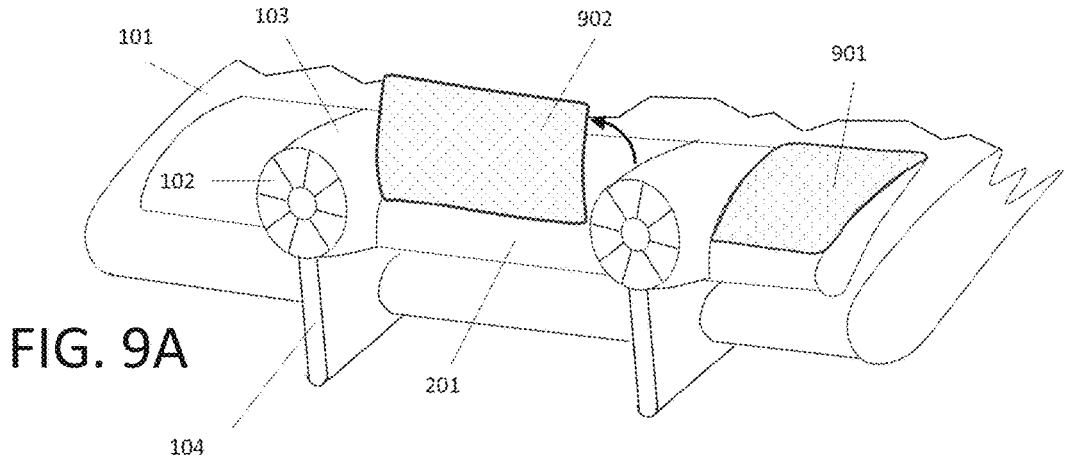
FIG. 9A
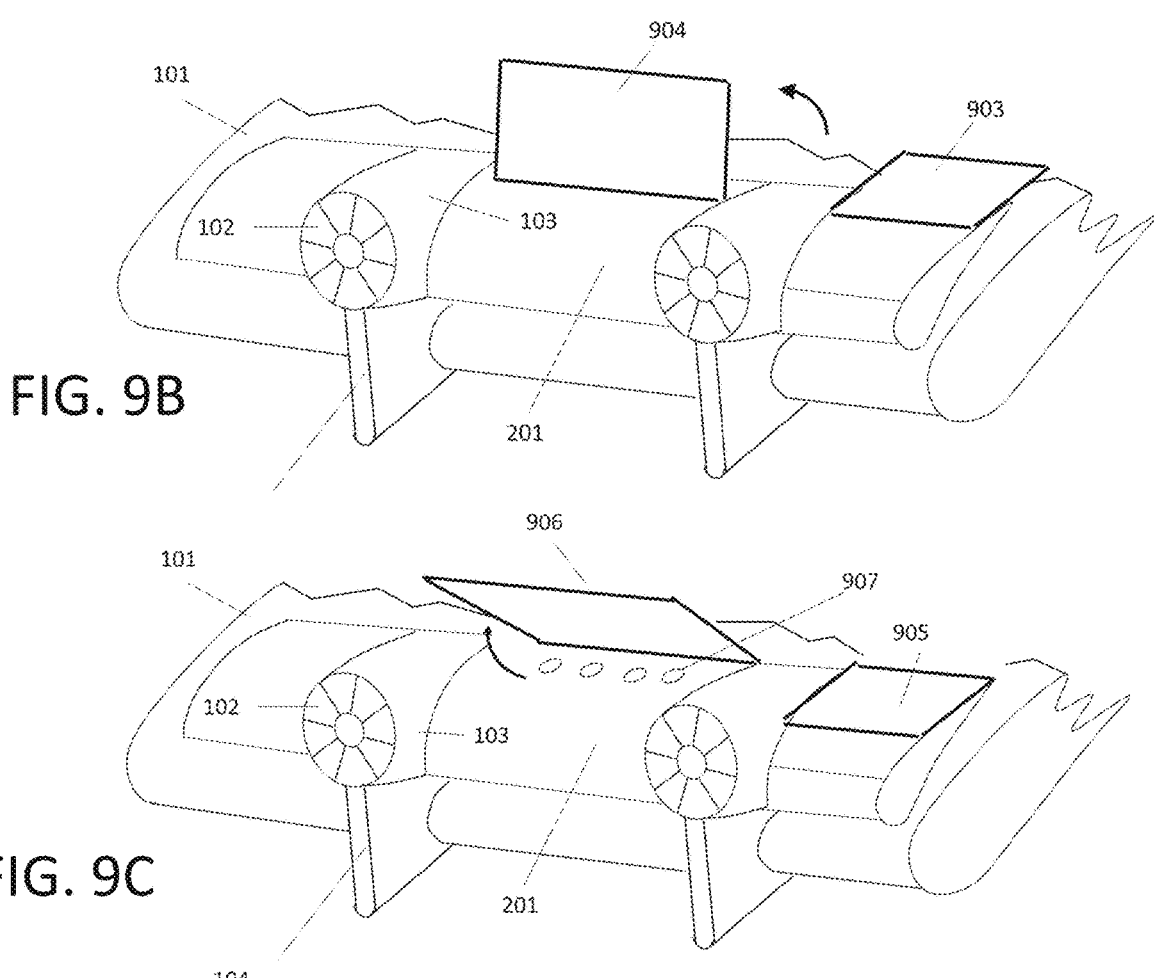
FIG. 9B
FIG. 9C

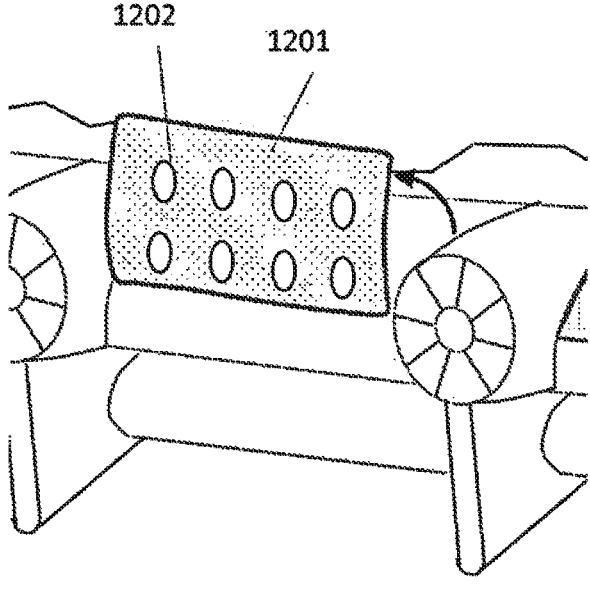
FIG. 12
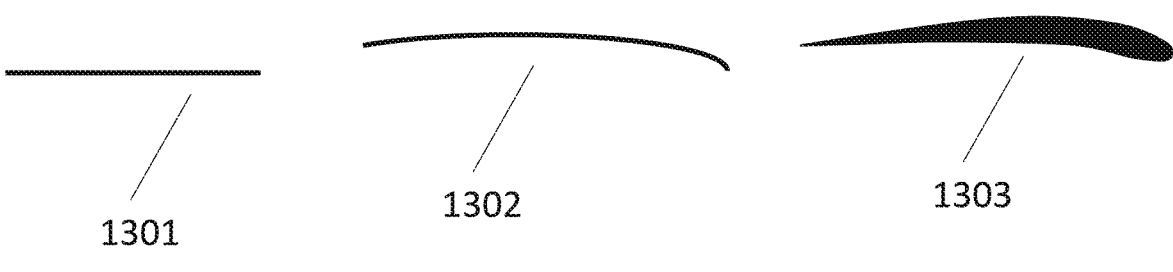
1301
FIG. 13A
1302
FIG. 13B
1303
FIG. 13C

1401

1402

1403

1603
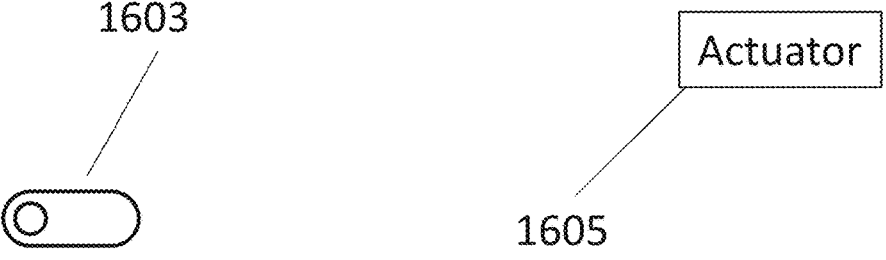
FIG. 16A
FIG. 16B
1602
1604
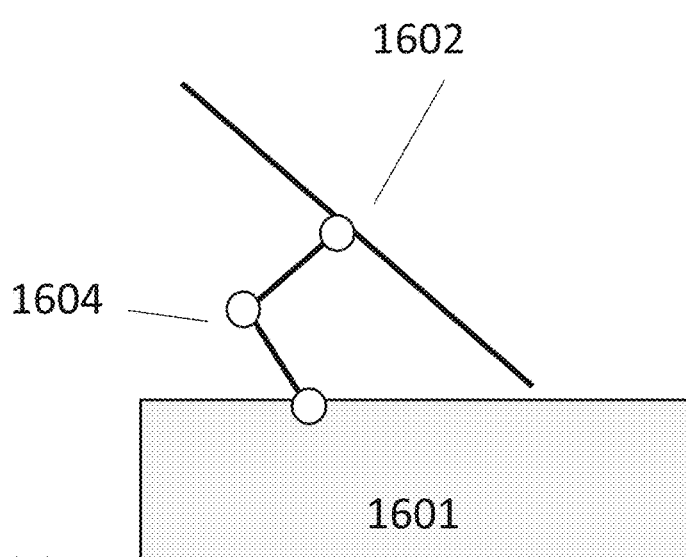
1601
FIG. 16C

LEADING-EDGE DUCTED FAN THRUST REDUCTION SYSTEM

FIELD OF THE INVENTION

The present invention generally relates to airplane airfoil drag; and particularly to an apparatus and system on an airfoil, and a method of use, to increase the airplane lift while minimally adding unwanted thrust.

BACKGROUND OF THE INVENTION

There is a strong need to develop aircraft that can take off and land in short distances. Shortening these distances over the current capabilities requires higher lift at low speeds and improved low-speed control capabilities. Increasing lift can be obtained using a lift-augmentation system.

The prior art discloses two types of leading-edge ducted fan systems that can provide the needed lift augmentation at sub-sonic speeds:

U.S. Pat. No. 10,926,868 (aka 868), "Distributed Leading-Edge Lifting Surface Slat and Associated Electric Ducted Fans for Fixed Lifting Surface Aircraft." Ullman, Horgan, and Homer, assigned to Cub Crafters, granted Feb. 3, 2021.

U.S. Pat. No. 10,099,793 (aka 793), "Distributed Electric Ducted Fan Wing," Ullman and Homer, granted Oct. 16, 2018.

These two patents will hereafter be referred to as 868 and 793. Patent 793 discloses a ducted fan accelerating air over the top surface of lifting surfaces and providing lift augmentation. Patent 868 discloses a combination of ducted fan and slat system to accomplish the same.

These systems not only augment lift but produce thrust. While the air accelerated by the ducted fans produces lift by lowering the pressure on the lifting surface, there is also a thrust component. This thrust component is helpful on takeoff and climb out but is unwanted during other phases of the flight envelope, such as descent and landing.

There are many ways of increasing the drag on an aircraft, such as spoilers, flaps, speed brakes, belly flaps, parachutes, deflected panels, and the like. The concept here is to increase the drag with a system integrated into the ducted fan system described in either U.S. Pat. Nos. 10,099,793 or 10,926,868. This aims to reduce the unwanted thrust by increasing the drag while minimally affecting the lift augmentation. Integrated means that the thrust reduction system is physically part of the lift augmentation system described in the patents.

The desire for an integrated system is predicated on the thought that the systems envisioned in U.S. Pat. Nos. 10,926,868 and 10,099,793 might be add-ons to existing aircraft or be implemented with the desire to minimally affect the design of aircraft. Thus, providing a single package that augments the lift with a useful thrust component and is also controllable with the thrust reduced is desirable.

SUMMARY OF THE INVENTION

The various embodiments of the present invention comprise: a powered aerodynamic lift device, comprising: a) one or more electric lift augmentation systems (ELAS) distributed along a span of an aerodynamic surface near a leading of an aerodynamic lifting element (ALE—i.e. airfoil), each ELAS comprising: i) one nacelle positioned along the leading edge of an aerodynamic lifting element; ii) an electric duct fan (EDF) housed within the nacelle, each EDF comprising a fan and a power source to operate the fan, wherein each EDF forces accelerated air through the fan; iii) one pylon (optional) positioned perpendicularly between the nacelle and the airfoil; and iv) one or more slats (optional); and b) one or more drag elements pivotably connected to the ELAS, and each drag element comprising a rotatable/hinged/pivotable plate connected to a control element able to rotate the plate to create a range of drag; and c) wherein the one or more ELAS's add drag while minimally reducing or even enhancing the lift augmentation of the powered aerodynamic lift device.

In an embodiment, one or more (e.g. a pair) of drag elements are pivotably connected to one or more EDFs (e.g. nacelle's outer curved surface), and face forward or backward. In an embodiment, one or more (e.g. a pair) of drag elements are pivotably connected to one or more pylons, which are connected between the nacelle and the airfoil, and the drag elements face forward or backward. In an embodiment, a slat is positioned above the leading edge of the aerodynamic lifting element, and the one or more drag elements are positioned on the slats, facing forward or backwards, on the leading or trailing edge of the slats.

In an embodiment, the ELAS's comprise a plurality of holes or gaps in the drag elements, slats, or nacelle.

In an embodiment, the assembly comprises one or more pylons extending perpendicular to an ALE leading edge, and the one or more drag elements, or the EDF and nacelle, are attached to the one or more pylons.

In an embodiment, the one or more drag elements comprise one or more shapes of: a planar flat plate; a curved flat plate shaped to fit over a nacelle when stowed; and an airfoil shape curved to fit over the ALE/airfoil when stowed. By way of non-limiting examples, the planar flat plates comprise: rectangular; rectangular with rounded corners; and rectangular while tapered moving aft.

In an embodiment, the one or more drag elements are rotatable from one or more positions that create drag to stowed positions that create no drag. For example, the one or more drag elements are connected on one end to the nacelle or slat or pylon, and the opposing end rotates against an airflow to create drag.

In an embodiment, the assemblies comprise an electrical circuit control system comprising a master control unit able to control the operation of the ELAS, the master control unit comprising: 1) a plurality of electronic speed controllers (ESCs) able to control the speed of the EDFs, 2) a plurality of pivot control units to position the drag elements; and 3) a plurality of actuators. For example, the master control unit further controls the modulation of energy supplied by a power source to the EDFs and drag elements, wherein the power source comprises one or more of: batteries, a fuel cell, an engine/generator or other electrical energy source.

In an embodiment, the assemblies comprise an actuator element coupled to each drag element, or to all drag elements connected to one nacelle, wherein the actuator element enables a pilot to control the rotation of the drag element. The actuator element further controls the modulation of energy supplied by a power source to the drag elements, wherein the power source comprises one or more of: batteries, a fuel cell, an engine/generator or other energy source comprising: pneumatically, hydraulically, or by using the flowing air to provide actuation force. And/or the drag elements are controlled by the pilot, manually or automatically or some combination thereof.

In an embodiment, the assemblies further comprise a gap between the drag elements and a surface the drag element is attached to comprising: the ALE; the nacelle; or a slat.

In another embodiment, one or more drag elements are on the leading edge of the airfoil (e.g. FIGS. 8A-8C).

BRIEF DESCRIPTION OF THE DRAWINGS

In the following drawings, all the deployable elements are called drag elements. They could also be called speed brakes, deflected panels, etc. The term "drag element" can be a single or multiple elements, as the drawings describe. Further, other elements, referred to as "flow elements," direct the flow in concert with the drag elements.

FIG. 5A is an illustration of a pair of opposing drag elements deployed in a generally spanwise direction from a nacelle, wherein the drag elements open/close rearward and are attached to the nacelle front surface.

FIG. 5B is an illustration of a pair of opposing drag elements deployed in a generally spanwise direction from a nacelle, wherein the drag elements open/close rearward and are attached to the nacelle back surface.

FIG. 5C is an illustration of a pair of opposing drag elements deployed in a generally spanwise direction from a nacelle, wherein the drag elements open/close forward and are attached to the nacelle back surface.

FIG. 9A is an illustration of drag elements deployed in a generally upward direction from near the slat's leading edge.

FIG. 9B is an illustration of drag elements deployed in a generally upward direction from the slats midsection.

FIG. 9C is an illustration of drag elements deployed in a generally upward direction from the slats trailing edge, wherein the drag elements open forward.

FIG. 12 is an illustration drag elements with holes.

FIG. 13A is an illustration of the cross section of drag element comprising a planar flat plates FIG. 13B is an illustration of the cross section of a drag element comprising a flat plate that is curved to fit the surface (e.g. airfoil/ALE or slat) when stowed.

FIG. 13C is an illustration of the cross section of a drag element generally curved, airfoil shaped with one side to fit the surface (e.g. airfoil/ALE or slat) when stowed.

FIG. 16A is an illustration of a pilot actuated switch or automatic mechanism to rotate drag elements into position or stow away.

FIG. 16B is an illustration of a linkage, screw or other actuator for rotating the drag elements, or powered by the EDFs.

FIG. 16C is an illustration of a pneumatic, hydraulic, electric mechanism to control rotation of the drag elements.

DETAILED DESCRIPTION OF EXEMPLARY EMBODIMENTS

Glossary of Terms

As used herein, the term "aerodynamic lifting element" or "ALE" refers to an airfoil.

As used herein, the term "lift augmentation" refers to the ratio of the lift generated by artificially accelerating the air over the upper aerodynamic surface of a lifting body (airfoil) to the lift generated without said acceleration.

As used herein, the term "electric lift augmentation system" or ELAS refers to an assembly comprising: an electric duct fan, housed within a nacelle, and an optional pylon, and an optional slat, wherein one or a pair of opposing drag elements are pivotably connected to the nacelle, pylon or slats.

As used herein, the term "EDF" refers to electric duct fan, which is housed within a nacelle.

As used herein, the term "nacelle" refers to a circular streamlined housing on the outside of an airfoil or ALE.

The basic concept is to add drag while minimally reducing or even enhancing the lift augmentation of the system. The systems patented in 868 and 793 both augment or enhance the lift on the surface of a body by increasing the velocity of the air over the convex surface of the body. For each doubling of the air velocity at a point, the lift is increased by a factor of four at that point, a square of the increase in velocity. The amount of augmentation at that point is thus four. The augmentation over a lifting surface is the sum of the local augmentations times the area acted on by each. The accelerated air also adds thrust, which in some scenarios such as descending and landing is unwanted.

Figure 1:
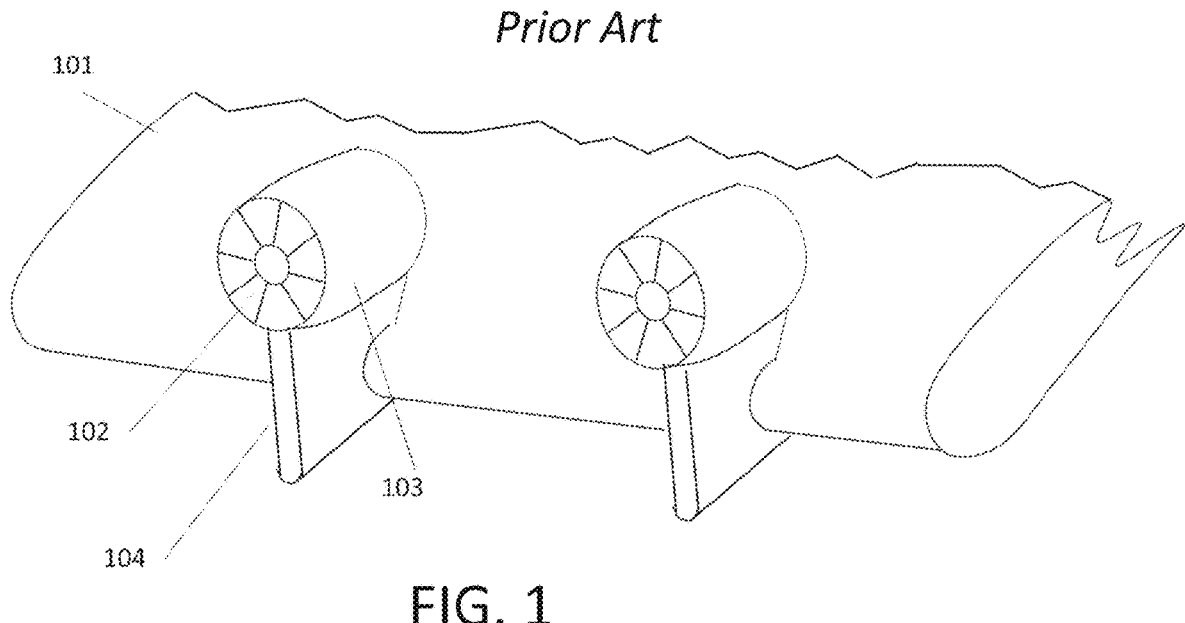
FIG. 1 is an illustration of a prior art leading-edge lift augmentation system envisioned in 793.

A majority of the concepts apply to both systems with slats (868) and without slats (793). FIG. 1 shows a typical system developed in prior art patent 793. Here, a lifting surface 101 has attached a system comprising an electric ducted fan (EDF) 102 housed in a nacelle 103. The EDF and nacelle are optionally held off the lifting surface by a pylon 104. The EDF, nacelle and optional pylon is one configuration of the ELAS.

Figure 2:
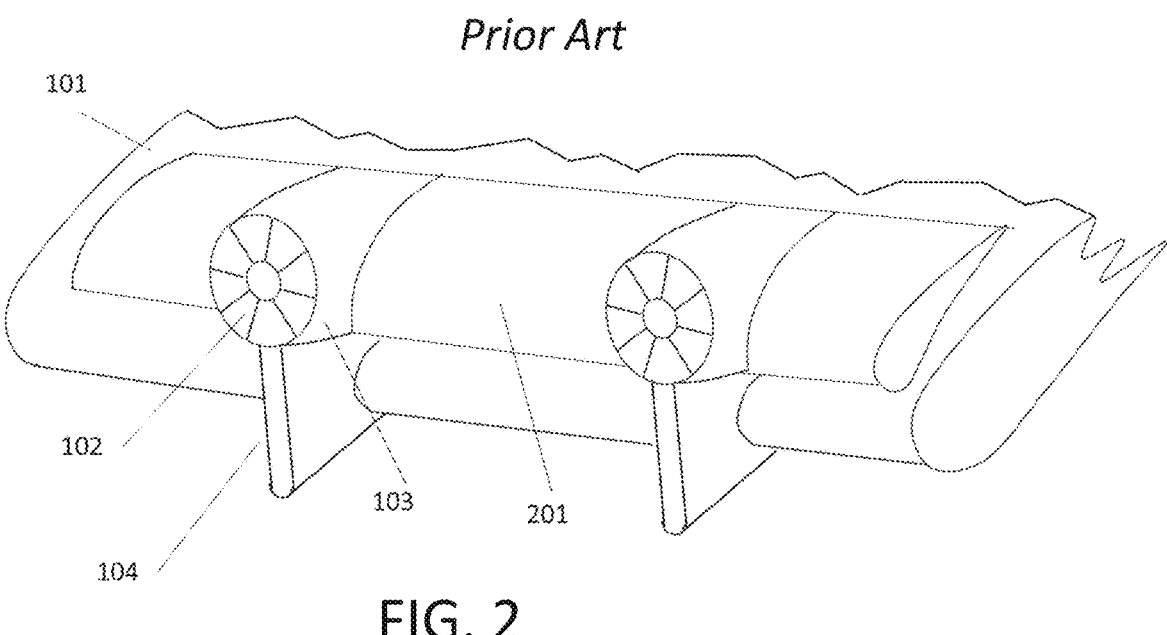
FIG. 2 is an illustration of a prior art typical leading-edge lift augmentation system envisioned in 868.
Figure 3A:
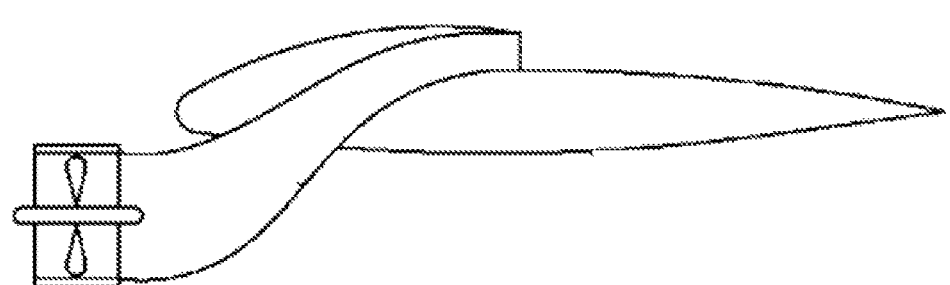
FIGS. 3A-3D are illustrations of a prior art optional placement of the EDFs relative to the lifting surface as envisioned in U.S. Pat. No. 10,099,793.
Figure 3B:
Figure 3C:
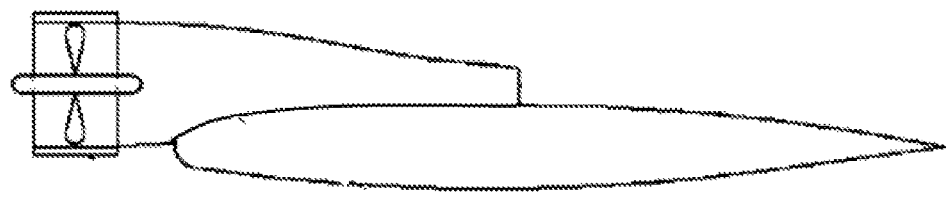
Figure 3D:
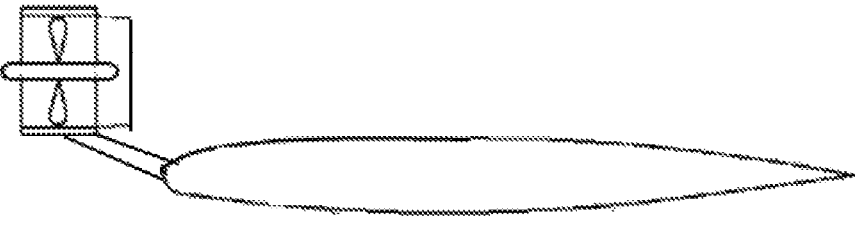

As shown in FIG. 2, the above system can also have slats 201, bridging the gap between nacelles 103 or extending beyond them as is covered in prior art patent 868. The EDF, nacelle, optional pylon and optional slat is one configuration of ELAS.

FIGS. 3A-3D are from prior art 793, and illustrate the possible relative position of the EDF normal to the lifting surface.

Figure 4:
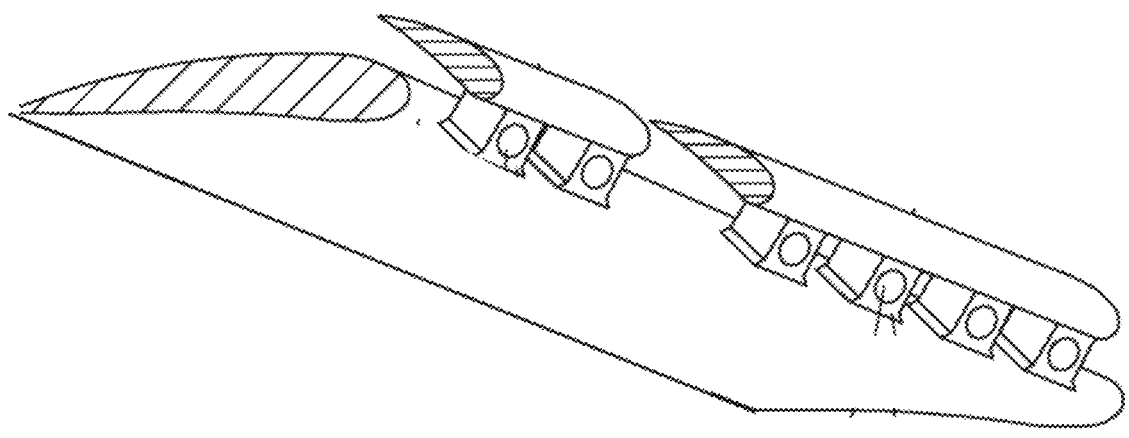
FIG. 4 is an illustration of a prior art placement of EDFs with slats as envisioned in U.S. Pat. No. 10,926,868.

FIG. 4 is taken from prior art patent 868, showing the spanwise distribution of nacelles.

FIG. 5A shows the electric ducted fan 102 housed in a nacelle 103 and with optional pylon 104 with extendable drag elements 501 flexibly attached or hinged to the nacelle 103 near the leading edge and opening to the rear, as shown. These can be stowed and streamlined into the shape of the nacelle when not deployed and then actuated into the airflow when needed, as shown. Drag elements 501 can be in pairs as shown or on just one side of nacelle 103. The deployed position can be variable if needed and asymmetrical if in pairs.

FIG. 5B shows the electric ducted fan 102 housed in a nacelle 103 with extendable drag elements 502 flexibly attached or hinged to the nacelle 103 near the trailing edge and opening to the rear as shown. As with 501, they can be variably and asymmetrical deployed. The extendable drag elements can direct the EDF thrust from side to side as needed either when stowed or deployed by moving them asymmetrically. Drag elements 502 can be in pairs as shown or on just one side. The deployed position can be variable if needed and asymmetrical if in pairs.

FIG. 5C shows the electric ducted fan 102 housed in a nacelle 103 with extendable drag elements 503 flexibly attached or hinged to the nacelle 103 near the trailing edge and opening forward. When stowed these are flush with the nacelle. These can be stowed and streamlined into the shape of the nacelle when not deployed and then actuated into the airflow when needed, as shown. Drag elements 503 can be in pairs as shown or on just one side. The deployed position can be variable if needed and asymmetrical if in pairs. Optionally, the aft edge of the drag elements 503 may be designed to add airflow to the EDF 102 air stream. Holes or vents 504 in nacelle 103 can be added to add airflow to the EDF 102 air stream.

6

Figures 6A, 6B, 6C:
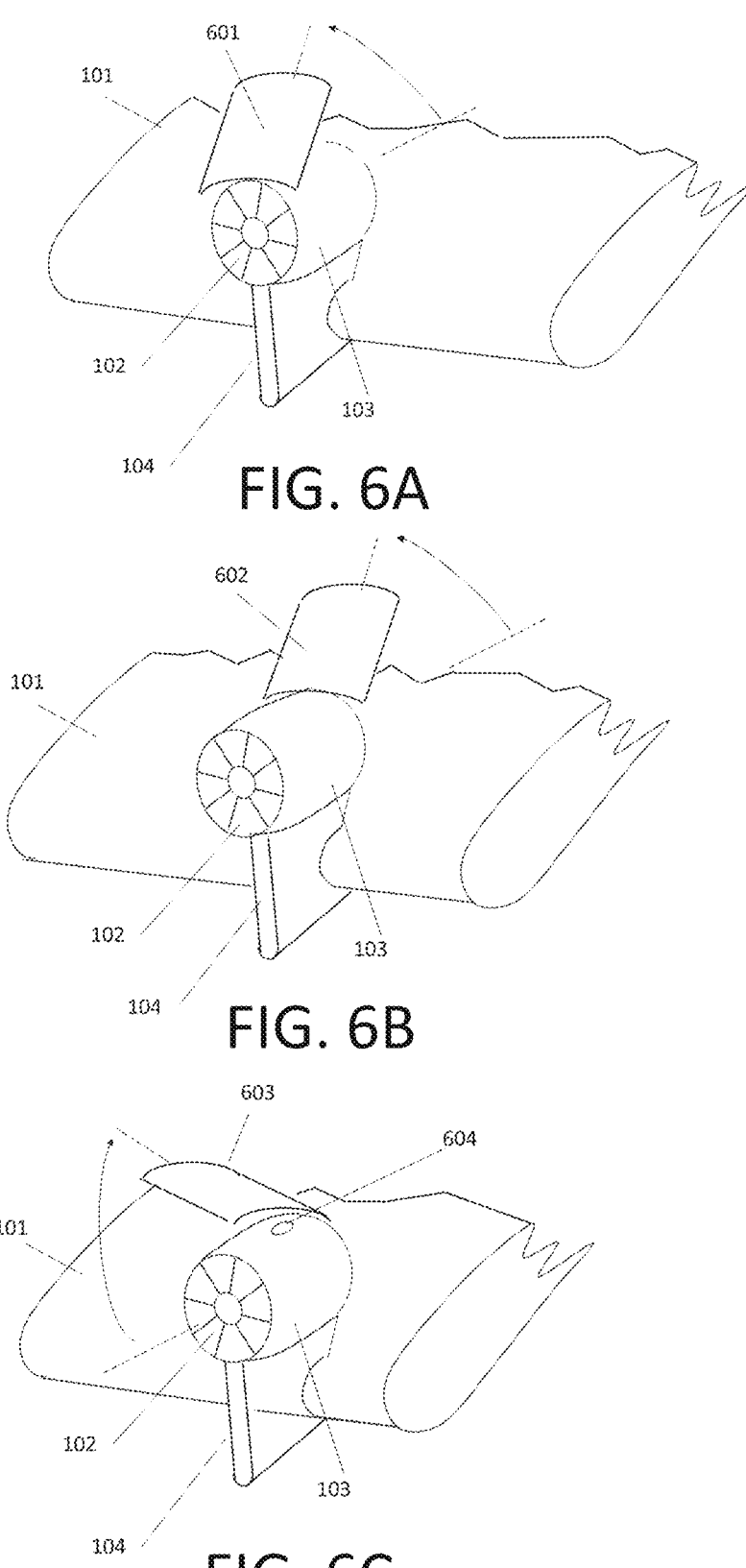
FIG. 6A is an illustration of one drag element deployed in a generally vertical direction from a nacelle, wherein the drag element opens/closes rearward and is attached to the nacelle front surface.
FIG. 6B is an illustration of one drag element deployed in a generally vertical direction from a nacelle, wherein the drag element opens/closes rearward and is attached to the nacelle back surface.
FIG. 6C is an illustration of one drag element deployed in a generally vertical direction from a nacelle, wherein the drag element opens/closes forward and is attached to the nacelle back surface.

FIG. 6A shows the electric ducted fan 102 housed in a nacelle 103 with extendable drag element 601 flexibly attached or hinged to the nacelle 103 near the leading edge and opening to the rear, as shown. This can be stowed and streamlined into the shape of the nacelle when not deployed and then actuated into the airflow when needed, as shown. Drag elements 601 deployed position can be variable if needed.

FIG. 6B shows the electric ducted fan 102 housed in a nacelle 103 with extendable drag elements 602 flexibly attached or hinged to the nacelle 103 near the trailing edge and opening to the rear, as shown. As with 601, it can be variably deployed. When stowed, the extendable drag element can vector the EDF 102 airflow. This may or may not occur in parallel with deployment for drag.

FIG. 6C shows the electric ducted fan 102 housed in a nacelle 103 with extendable drag elements 603 flexibly attached or hinged to the nacelle 103 near the trailing edge and opening forward. As with 601, it can be variably deployed. The deployed position can be variable if needed. Optionally, the aft edge of the drag elements 603 may be designed to add airflow to the EDF 102 air stream. Holes or vents 604 in nacelle 103 can be added to add airflow to the EDF 102 air stream.

Figure 7A:
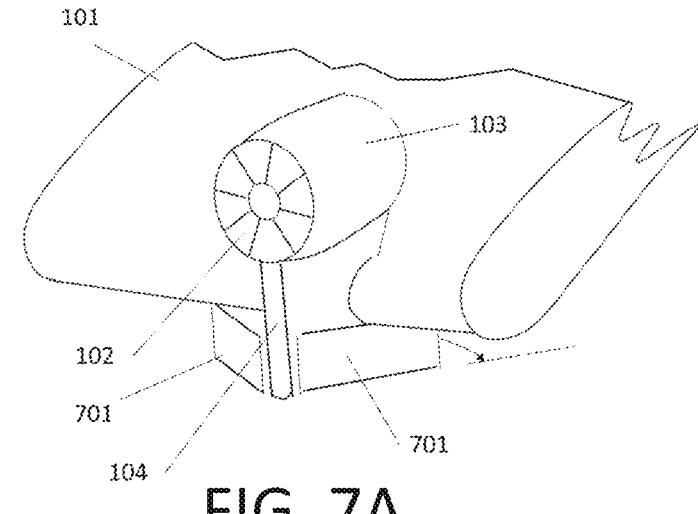
FIG. 7A is an illustration of a pair drag elements deployed in a general spanwise direction from a pylon, wherein the drag element opens/closes rearward, are generally rectangular shaped and do not extend below the pylon.

FIG. 7A shows the electric ducted fan 102 housed in a nacelle 103 with extendable drag element 701 flexibly attached or hinged to the pylon 104 anywhere along its chordwise dimension. Elements 701 can be stowed and streamlined into the shape of the pylon when not deployed and then actuated into the airflow when needed, as shown. Drag elements 701 deployed position can be variable if needed.

Figure 7B:
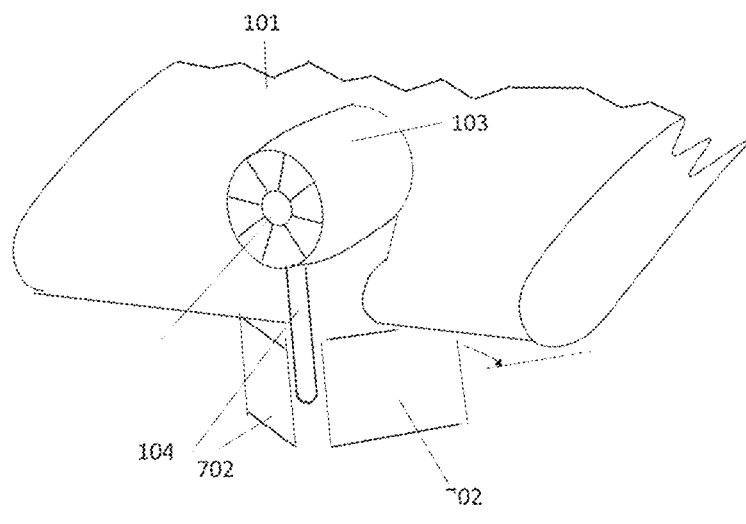
FIG. 7B is an illustration of a pair drag elements deployed in a general spanwise direction from a pylon, wherein the drag element opens/closes rearward, and are generally square or rectangular shaped and extend below the pylon.

FIG. 7B is the same as FIG. 7A, but with the drag element 702, a different shape relative to the pylon 104 may be used in some instantiations when no or minimal pylon exists.

Figure 7C:
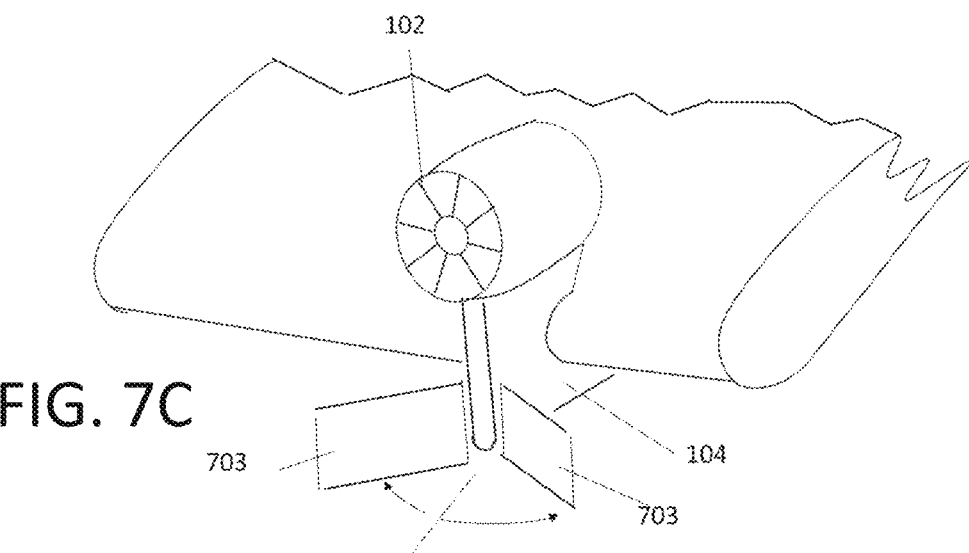
FIG. 7C is an illustration of a pair drag elements deployed in a general spanwise direction from a pylon, wherein the drag element opens/closes forward, and are generally square or rectangular shaped and may extend below the pylon.

FIG. 7C shows the electric ducted fan 102 with extendable drag elements 703 flexibly attached or hinged to the nacelle 103 near the leading edge and opening forward. As with 701, it can be variably deployed. The deployed position can be variable if needed.

Figure 8A:
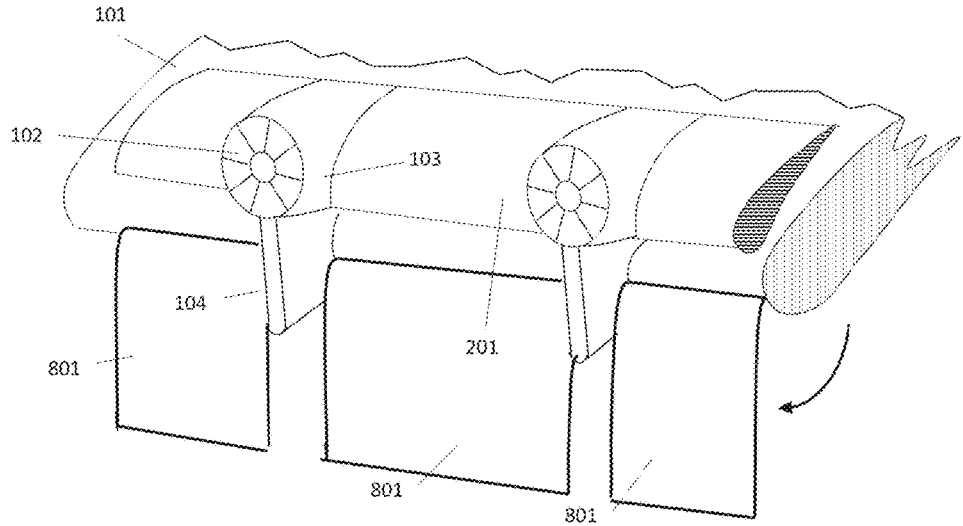
FIG. 8A is an illustration of an ELAS with a slat and a plurality of drag elements deployed in a generally spanwise direction from a pylon or lifting surface (e.g. an ALE/airfoil leading edge).

FIG. 8A shows drag elements 801 hinged or flexibly attached to the pylon 104, or other fixed features of the ELAS system. In its non-extended position, this drag element is faired into the lifting surface 101. When deployed as shown, it both acts as a type of Kreuger flap providing drag but also directs the airflow into the slot between the slat 201 and the lifting surface 101 to be entrained in the flow created by the forward velocity of the vehicle enhanced by the airflow created by the EDFs 102. Kreuger flaps are used on airliners to increase the lift on the wing during landing by adding effective camber to the airfoil. Here they are uniquely used to not only to increase the effective camber, but also direct additional air into the EDFs and under the slat, enhancing the lift augmentation.

Figure 8B:
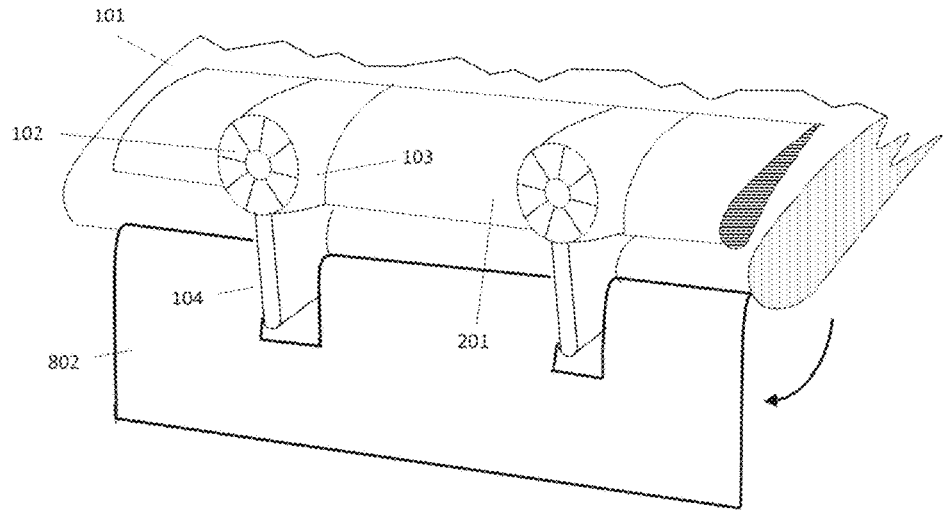
FIG. 8B is an illustration of an ELAS with a slat and one drag element extending in a generally spanwise direction from a plurality of pylons or a lifting surface (e.g. an ALE/airfoil leading edge), wherein the exemplified drag element has rectangular shaped openings/cutouts to fit around two pylons.

FIG. 8B shows drag element 802 hinged or flexibly attached to either near the leading edge of the lifting surface 101, the pylon 104, or other fixed features of the system. This is a continuous version of drag elements 801.

Figure 8C:
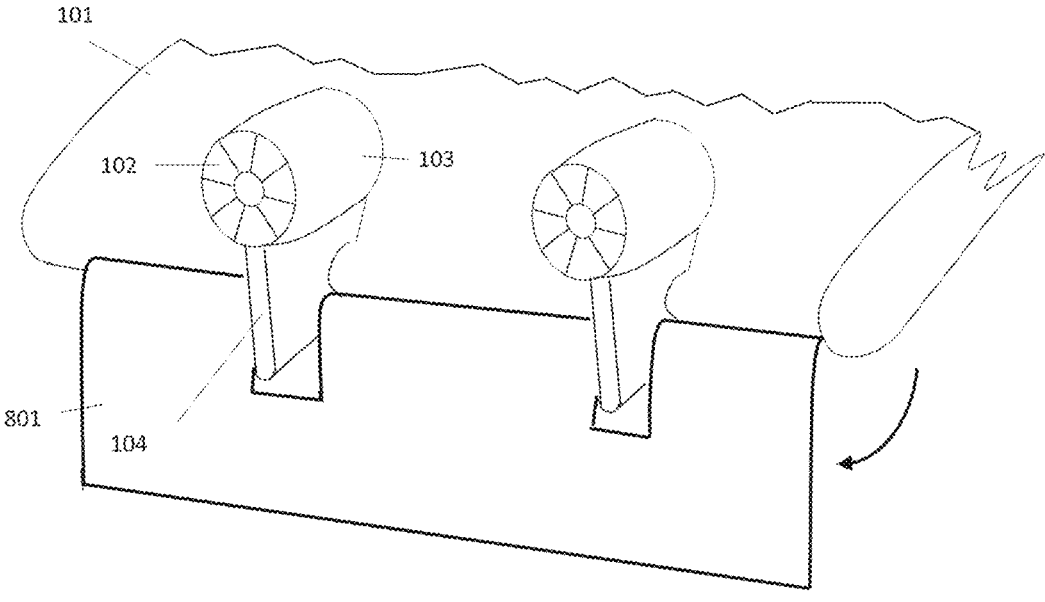
FIG. 8C is an illustration of an ELAS without a slat, and one drag element extending in a generally spanwise direction from a plurality of pylons or a lifting surface (e.g. an ALE/airfoil leading edge), wherein the exemplified drag element has rectangular shaped openings/cutouts to fit around two pylons.

FIG. 8C is similar to FIGS. 8A and 8B, but there are no slats between the nacelles per patent 793, and the drag element 801 spanning multiple EDF 102, nacelles 103, and optionally pylon 104 structures is hinged or flexibly attached on the pylons 104 or flexibly attached or hinged to the lifting surface 101.

FIG. 9A shows the electric ducted fan 102 housed in a nacelle 103 with extendable drag elements 901 flexibly attached or hinged to the slat 201 near the leading edge and opening to the rear as shown 902. These can be stowed and streamlined into the shape of the nacelle when not deployed and then actuated into the airflow when needed, as shown.

FIG. 9B shows the electric ducted fan 102 housed in a nacelle 103 with extendable drag elements 903 flexibly attached or hinged to the slat 201 near the trailing edge and opening to the rear as shown 904. These can be streamlined into the shape of the slat or extended behind it to guide the airflow when not deployed and then actuated to provide drag when needed, as shown.

FIG. 9C shows the electric ducted fan 102 housed in a nacelle 103 with extendable drag elements 905 flexibly attached or hinged to the slat 201 near the trailing edge and opening forward as shown 906. These can be streamlined into slat 201 when not deployed 905 and then actuated to provide drag when needed, as shown, 906. Holes or vents 907 in slat 201 can add airflow between the slat and the lifting surface 101.

Figure 10:
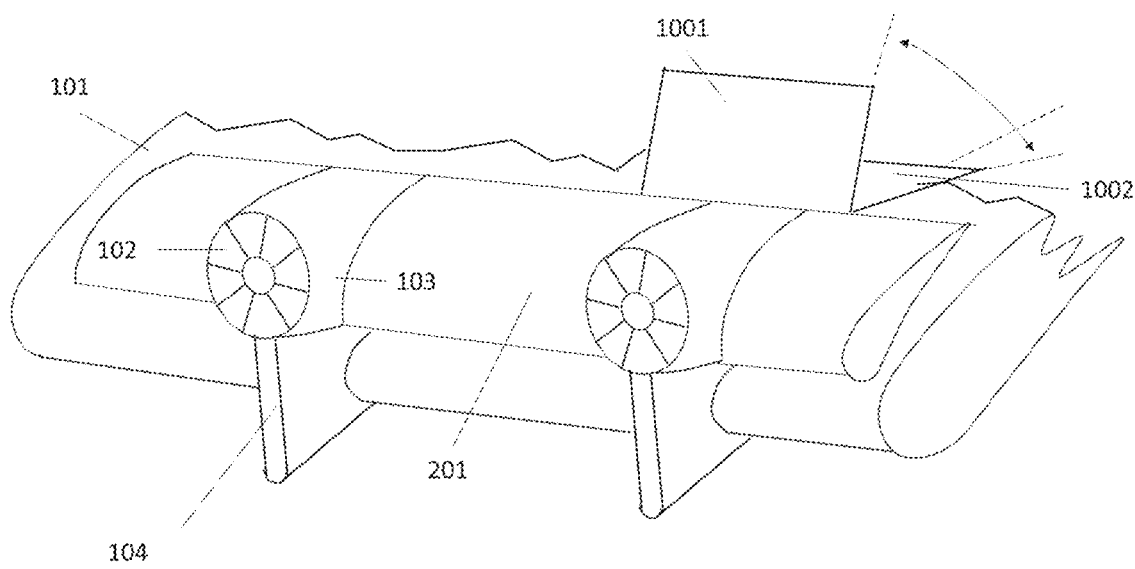
FIG. 10 is an illustration of drag elements deployed in a generally upward direction from the slats trailing edge, wherein the drag elements open rearward.

FIG. 10 shows the electric ducted fan 102 housed in a nacelle 103 with extendable drag elements 1001 and 1002 flexibly attached or hinged to the slat 201 near the trailing edge, with 1001 opening upwards away from the lifting surface 101 and 1002 opening toward the lifting surface. As shown, these can be streamlined when not deployed and then actuated to provide drag and flow control when needed. The motion of 1001 and 1002 need not be symmetrical. Further, they can be installed aft of the EDF 102 or between them as needed.

Figure 11:
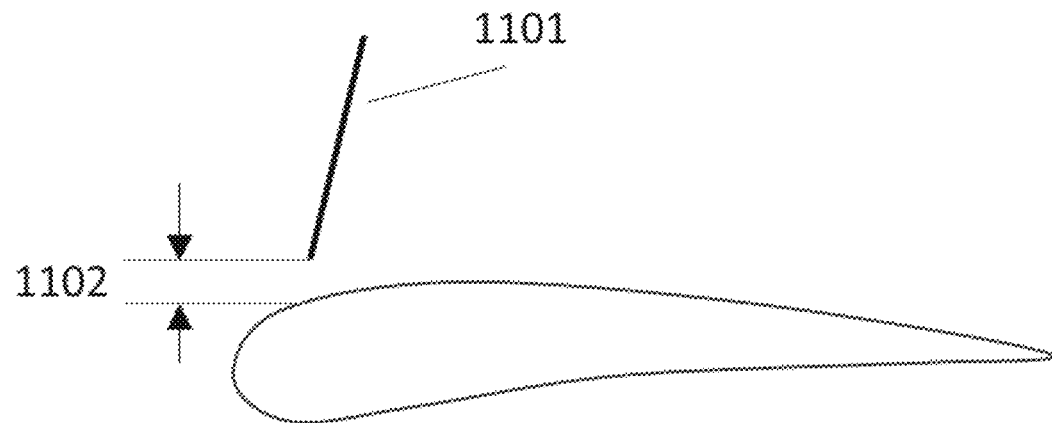
FIG. 11 is an illustration a gap between drag elements and surface/ELAS.

As shown in FIG. 11, all the drag and flow control elements 1101 shown in FIGS. 3-14 can be gapped 1102 from the surfaces. A gap is the space between the drag element and the lifting surface or other surface on which the drag element is attached. This gap allows air flow between the drag element and the surface on which it is mounted.

As shown in FIG. 12, all the drag and flow control elements 1201 shown in FIGS. 3-10 can have holes in their surfaces 1202 to allow flow. These holes may or may not be round as shown, may or may not be in a grid pattern as shown, and may vary in number as shown in FIG. 15.

Figures 14A, 14B, 14C:
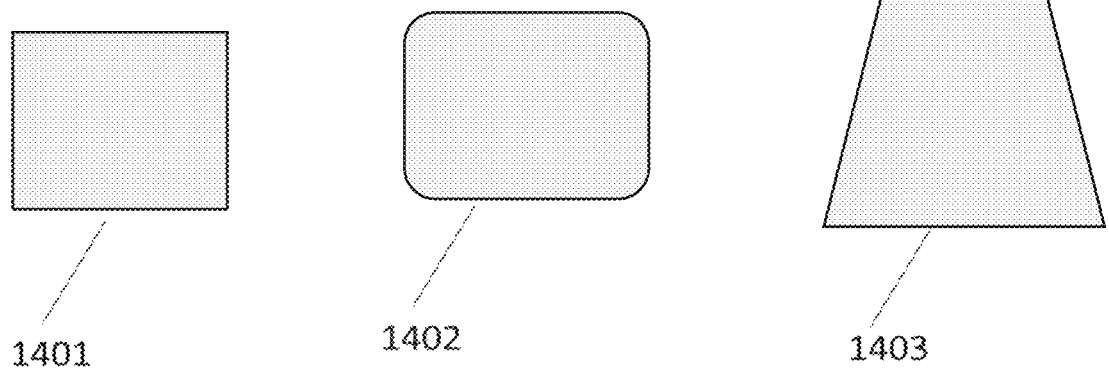
FIG. 14A is an illustration of the planform (top/bottom plan view) of a rectangular drag element.
FIG. 14B is an illustration of the planform (top/bottom plan view) of a rectangular with rounded corners drag element.
FIG. 14C is an illustration of the planform (top/bottom plan view) of a rectangular but tapered moving aft drag element.

All the drag and flow control elements shown in FIGS. 3-12 need not be rectangular and may assume other shapes in cross-section and planform as needed and shown in FIGS. 13A-13C and 14A-14C. As illustrated in FIGS. 13A-13C, cross sectional shapes include planar flat plates 1301, flat plates curved to fit the surface when stowed, 1302 and airfoil shapes with one side to fit the surface when stowed, 1303. Planform shapes include rectangular 1401 (FIG. 14A), rectangular with rounded corners 1402 (FIG. 14B), rectangular but tapered moving aft, 1403 (FIG. 14C).

Figure 15A:
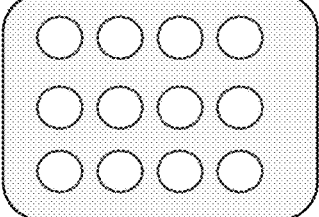
FIG. 15A is an illustration of a plurality of circular holes within a drag element.
Figure 15B:
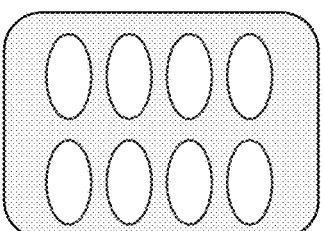
FIG. 15B is an illustration of a plurality of oval holes within a drag element.
Figure 15C:
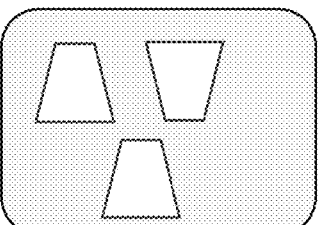
FIG. 15C is an illustration of a plurality of isosceles trapezoid holes within a drag element.

FIGS. 15A-15C illustrate a variety of types of holes in drag elements. They may or may not be round 1202 as shown in FIG. 12, and may or may not be in a grid pattern as shown, and may vary in number as shown in FIGS. 15A-15C.

FIGS. 16A-16C illustrate drag or flow control elements shown in FIGS. 3-12 that can be actuated electrically, pneumatically, hydraulically, or by using the flowing air to provide actuation force. FIG. 16A is an illustration of a pilot actuated switch 1603 or automatic mechanism to rotate drag elements into position or stow away. FIG. 16B is an illustration of a linkage, screw, or other actuator 1605 for rotating the drag elements, or powered by the EDFs. FIG. 16C is an illustration of a pneumatic, hydraulic, electric mechanism 1604 to control rotation of the drag elements 1602 from a lifting surface 1601.

Method of Use

The system uses the thrust of the EDFs to provide additional lift. However, in some conditions the lift is wanted, but the additional thrust is not.

The system described here is used when there is need for lift enhancement without the additional thrust provided by the EDFs, or when the drag needed is greater than the thrust provided by the EDFs. This is generally during descent for landing but could be applied during other situations where high lift is needed with no additional or reduced thrust. In these conditions the pilot can actuate the system or it can be automatically actuated.

The pilot activates the EDFs and positioning of the drag elements 501 using one or more of the control elements in FIGS. 16A-16C. In an embodiment, each drag element 501 or pairs of drag elements on the same EDF, move simultaneously. In another embodiment, all drag elements 501 on the same air foil move simultaneously. In yet another embodiment, all drag elements 501 on all air foils move simultaneously.

CONCLUSION

While the invention has been described in connection with what is presently considered to be the most practical and preferred embodiment, it is to be understood that the invention is not to be limited to the disclosed embodiment (s), but on the contrary, is intended to cover various modifications and equivalent arrangements included within the spirit and scope of the appended claims, which scope is to be accorded the broadest interpretation so as to encompass all such modifications and equivalent structures as permitted under the law.

Further, it should be understood that while the use of the word preferable, preferably, or preferred in the description above indicates that feature so described may be more desirable, it nonetheless may not be necessary and any embodiment lacking the same may be contemplated as within the scope of the invention, that scope being defined by the claims that follow.

In reading the claims it is intended that when words such as "a," "an," "at least one" and "at least a portion" are used, there is no intention to limit the claim to only one item unless specifically stated to the contrary in the claim. Further, when the language "at least a portion" and/or "a portion" is used the item may include a portion and/or the entire item unless specifically stated to the contrary.

As used herein, the term "substantially" refers to a shape similar to the one stated.

Trademarks are the property of their owners.

What is claimed is:

1. A powered aerodynamic lift device, comprising:

a) one or more electric lift augmentation systems (ELAS) distributed along a span of an aerodynamic lifting element (ALE), each ELAS comprising:

ii) one or more nacelles positioned along the leading edge of an aerodynamic lifting element;

ii) an electric duct fan (EDF) housed within each of the one or more nacelles, each EDF comprising a fan and a power source to operate the fan, wherein each EDF forces accelerated air through the fan;

b) one or more drag elements pivotably connected to the nacelle, facing forward or backward, and comprising a rotatable/hinged/pivotable plate connected to a control element able to rotate the plate to create a range of drag; and c) wherein the one or more ELAS increase an airplane lift.

2. The powered aerodynamic lift device of claim 1, further comprising a plurality of holes or vents in the one or more drag elements or the one or more nacelles.

3. The powered aerodynamic lift device of claim 1, wherein the one or more drag elements comprise one or more shapes of: a planar flat plate; a curved flat plate shaped to fit over a nacelle when stowed; and an airfoil shape curved to fit over the ALE when stowed.

4. The powered aerodynamic lift device of claim 3, wherein the planar flat plates comprise: rectangular; rectangular with rounded corners; and rectangular while tapered moving aft.

5. The powered aerodynamic lift device of claim 1, wherein the one or more drag elements are rotatable from one or more positions that create drag to stowed positions that create no drag.

6. The powered aerodynamic lift device of claim 1, further comprising an electrical circuit control system comprising a master control unit able to control the operation of the one or more drag elements, the master control unit comprising: 1) a plurality of electronic speed controllers (ESCs) able to control the speed of the EDFs, 2) a plurality of pivot control units to position the drag elements; and 3) a plurality of actuators.

7. The powered aerodynamic lift device of claim 6, wherein the master control unit further controls the modulation of energy supplied by the power source to the EDFs and drag elements, wherein the power source comprises one or more of: batteries, a fuel cell, an engine/generator or other electrical energy source.

8. The powered aerodynamic lift device of claim 1, further comprising an actuator element coupled to each drag element, or to all drag elements connected to one nacelle, or to all drag elements connected to the ALE, wherein the actuator element enables a pilot to control the rotation of the drag element(s).

9. The powered aerodynamic lift device of claim 8, wherein the actuator element further controls the modulation of energy supplied by the power source to the drag elements, wherein the power source comprises one or more of: batteries, a fuel cell, an engine/generator or other energy source comprising: pneumatically, hydraulically, or by using the flowing air to provide actuation force.

10. The powered aerodynamic lift device of claim 1, wherein the drag elements are controlled by the pilot, manually or automatically or some combination thereof.

11. The powered aerodynamic lift device of claim 1, further comprising a gap between the drag element and a surface the drag element is attached to, the surface comprising: the ALE; the nacelle; or a slat.

12. The powered aerodynamic lift device of claim 1, comprising one drag element per ELAS.

13. The powered aerodynamic lift device of claim 1, comprising a pair of opposing drag elements per ELAS.

14. A powered aerodynamic lift device, comprising:
   a) one or more electric lift augmentation systems (ELAS) distributed along a span of an aerodynamic lifting element (ALE), each ELAS comprising:
      ii) one or more nacelles positioned along the leading edge of an aerodynamic lifting element;
      ii) an electric duct fan (EDF) housed within each of the one or more nacelles, each EDF comprising a fan and a power source to operate the fan, wherein each EDF forces accelerated air through the fan;
   b) a pair of opposing drag elements pivotably connected per ELAS, and comprising a rotatable/hinged/pivotable plate connected to a control element able to rotate the plate to create a range of drag; and
   c) wherein the one or more ELAS increase an airplane lift.

15. The powered aerodynamic lift device of claim 14, wherein the pair of drag elements are positioned on the nacelle, facing forward or backward.

16. The powered aerodynamic lift device of claim 14, wherein the ELAS further comprises a pylon positioned perpendicularly between the nacelle and the airfoil, and wherein the pair of drag elements are positioned on the pylon, facing forward or backward.

17. The powered aerodynamic lift device of claim 14, wherein the ALE further comprises one or more slats, and wherein the pair of drag elements are positioned on the one or more slats facing forward or backward.

18. The powered aerodynamic lift device of claim 14, wherein the pair of drag elements comprise one or more shapes of: a planar flat plate; a curved flat plate shaped to fit over a nacelle when stowed; and an airfoil shape curved to fit over the ALE when stowed.

19. The powered aerodynamic lift device of claim 14, wherein the pair of drag elements are rotatable from one or more positions that create drag to stowed positions that create no drag.

\* \* \* \* \*